US012802496B2

(12) United States Patent
Froeschl et al.

(10) Patent No.: US 12,802,496 B2
(45) Date of Patent: Nov. 17, 2026

(54) CONTROL DEVICE AND METHOD FOR DETECTING A VEHICLE FUNCTION OF A VEHICLE, SERVER AND METHOD FOR EVALUATING A VEHICLE FUNCTION OF A VEHICLE

(71) Applicant: Bayerische Motoren Werke Aktiengesellschaft, Munich (DE)

(72) Inventors: Joachim Froeschl, Herrsching (DE); Anton Renner, Woerth (DE); Eva Bernal Serra, Dachau (DE); Eva-Maria Seifert, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 58 days.

(21) Appl. No.: 18/715,524

(22) PCT Filed: Sep. 28, 2022

(86) PCT No.: PCT/EP2022/076907

§ 371 (c)(1),
(2) Date: May 31, 2024

(87) PCT Pub. No.: WO2023/110181

PCT Pub. Date: Jun. 22, 2023

(65) Prior Publication Data

US 2025/0037518 A1 Jan. 30, 2025

(30) Foreign Application Priority Data

Dec. 14, 2021 (DE) ..................... 10 2021 132 956.6

(51) Int. Cl.
*G05D 1/00* (2024.01)
*G07C 5/00* (2006.01)
*G07C 5/08* (2006.01)

(52) U.S. Cl.
CPC ........... *G07C 5/008* (2013.01); *G07C 5/0808* (2013.01)

(58) Field of Classification Search
CPC ...................................................... G07C 5/008
See application file for complete search history.

(56) References Cited

U.S. PATENT DOCUMENTS

2013/0325214 A1 12/2013 Vos
2020/0193738 A1* 6/2020 Kang .................. B60R 16/0232

(Continued)

FOREIGN PATENT DOCUMENTS

DE 10014994 A1 10/2000
DE 10303439 A1 8/2003

(Continued)

OTHER PUBLICATIONS

International Search Report corresponding to International Patent Application No. PCT/EP2022/076907, dated Jan. 16, 2023 (4 pages).

(Continued)

*Primary Examiner* — Ellis B. Ramirez
*Assistant Examiner* — Paul W Arellano
(74) *Attorney, Agent, or Firm* — Maginot, Moore & Beck LLP

(57) ABSTRACT

A method detects a vehicle function of a vehicle having a plurality of energy paths and a plurality of energy consumers. Each energy path contains at least one energy consumer. In response to an active state of the vehicle function in the vehicle, usage data of the vehicle function is generated. The usage data include an identifier of the vehicle function, an identifier associated with the vehicle function of at least one energy path of the plurality of energy paths and an identifier associated with the vehicle function of at least a first energy consumer of the plurality of energy consumers. The the (Continued)

usage data are indicative of an energy path that is active based on the active state of the vehicle function for the provision of electrical energy to the first energy consumer. The method also includes transmitting of the usage data from the vehicle to a server.

19 Claims, 6 Drawing Sheets

(56) References Cited

U.S. PATENT DOCUMENTS

| | | | | |
|---|---|---|---|---|
| 2021/0039595 | A1* | 2/2021 | Kitamura | B60L 58/10 |
| 2021/0163017 | A1* | 6/2021 | Fredman | B60W 50/04 |
| 2021/0291841 | A1* | 9/2021 | Yamane | B60K 35/80 |

FOREIGN PATENT DOCUMENTS

| | | | |
|---|---|---|---|
| DE | 102013022155 | A1 | 7/2014 |
| DE | 102013215978 | A1 | 2/2015 |
| DE | 102015219232 | B3 | 4/2017 |
| DE | 102018214470 | A1 | 2/2020 |
| DE | 102020102521 | A1 | 8/2021 |

OTHER PUBLICATIONS

Written Opinion corresponding to International Patent Application No. PCT/EP2022/076907, dated Jan. 16, 2023 (7 pages).
German Search Report corresponding to German Patent Application No. 10 2021 132 956.6, dated Jul. 19, 2022. (8 pages).
Chinese Office Action corresponding to Chinese Patent Application No. 202280081337.2, dated Apr. 2, 2026. (16 pages).

* cited by examiner

CONTROL DEVICE AND METHOD FOR DETECTING A VEHICLE FUNCTION OF A VEHICLE, SERVER AND METHOD FOR EVALUATING A VEHICLE FUNCTION OF A VEHICLE

The present application is the U.S. national phase of PCT Application PCT/EP2022/076907 filed on Sep. 28, 2022, which claims priority of German patent application No. 102021132956.6 filed on Dec. 14, 2021, the entire contents of which are incorporated herein by reference.

TECHNICAL FIELD

The present disclosure relates to the method and a control unit for detecting a vehicle function and to a method and a server for evaluating a vehicle function.

BACKGROUND

A large number of vehicle functions are implemented in vehicles, which in turn may require multiple sensors, actuators, control units, gateways or other electronic systems to operate. The vehicle configuration and thus the combination of vehicle functions can also differ from vehicle to vehicle. This increases the complexity of detecting vehicle usages.

There is therefore a need to provide improved detection and evaluation of a usage of a vehicle.

SUMMARY

This need is taken into account by the method, the control unit and the server according to the independent claims.

According to a first aspect of the present disclosure a method for detecting a vehicle function of a vehicle is provided. The vehicle contains a plurality of energy paths and a plurality of energy consumers, wherein each energy path of the plurality of energy paths contains at least one energy consumer of the plurality of energy consumers. The method includes the generation of usage data of the vehicle function in response to an active state of the vehicle function in the vehicle. The usage data include an identifier of the vehicle function, an associated identifier of at least one energy path of the plurality of energy paths, and an associated identifier of at least one energy consumer of the plurality of energy consumers. The usage data are indicative of an active energy path for providing electrical energy to the energy consumer due to the active state of the vehicle function. The method also includes the transmission of usage data from the vehicle to a server.

According to a second aspect of the present disclosure, a method for the evaluation of a vehicle function of a vehicle is provided. The vehicle contains a plurality of energy paths and a plurality of energy consumers, wherein each energy path of the plurality of energy paths contains at least one energy consumer of the plurality of energy consumers. The method involves receiving usage data of the vehicle function from the vehicle. The usage data include an identifier of the vehicle function, an associated identifier of at least one energy path of the plurality of energy paths, and an associated identifier of at least one energy consumer of the plurality of energy consumers. The usage data are indicative of an active energy path for the provision of electrical energy to the energy consumer due to an active state of the vehicle function. The method also includes determining a usage of the vehicle function based on the usage data.

According to a third aspect of the present disclosure, a control unit is provided for detecting a vehicle function of a vehicle. The vehicle contains a plurality of energy paths and a plurality of energy consumers, wherein each energy path of the plurality of energy paths contains at least one energy consumer of the plurality of energy consumers. The control unit includes a processing circuit that is designed to generate usage data of the vehicle function in response to an active state of the vehicle function in the vehicle. The usage data include an identifier of the vehicle function, an associated identifier of at least one energy path of the plurality of energy paths, and an associated identifier of at least one energy consumer of the plurality of energy consumers. The usage data are indicative of an active energy path for the provision of electrical energy to the energy consumer due to an active state of the vehicle function. The processing circuit is also designed to transmit the usage data from the vehicle to a server.

According to a fourth aspect of the present disclosure, a server for the evaluation of a vehicle function of a vehicle is provided. The vehicle contains a plurality of energy paths and a plurality of energy consumers, wherein each energy path of the plurality of energy paths contains at least one energy consumer of the plurality of energy consumers. The server contains a processing circuit that is designed to receive usage data of the vehicle function from the vehicle. The usage data include an identifier of the vehicle function, an associated identifier of at least one energy path of the plurality of energy paths, and an associated identifier of at least one energy consumer of the plurality of energy consumers. The usage data are indicative of an active energy path for the provision of electrical energy to the energy consumer due to the active state of the vehicle function. The processing circuit is also designed to determine a usage of the vehicle function based on the usage data.

According to a fifth aspect of the present disclosure, a non-volatile machine-readable storage medium is provided on which is stored a program containing a program code for performing a method described herein when the program is executed on a processor or programmable hardware.

According to a sixth aspect of the present disclosure, a program is provided containing a program code for carrying out a method described herein when the program is executed on a processor or programmable hardware.

Exemplary embodiments are explained in more detail below with reference to the enclosed figures.

DETAILED DESCRIPTION

Various exemplary embodiments are now described in more detail with reference to the accompanying drawings, in which some exemplary embodiments are shown. In the figures, the thickness dimensions of lines, layers and/or regions may be exaggerated for the sake of clarity.

Figure 1:
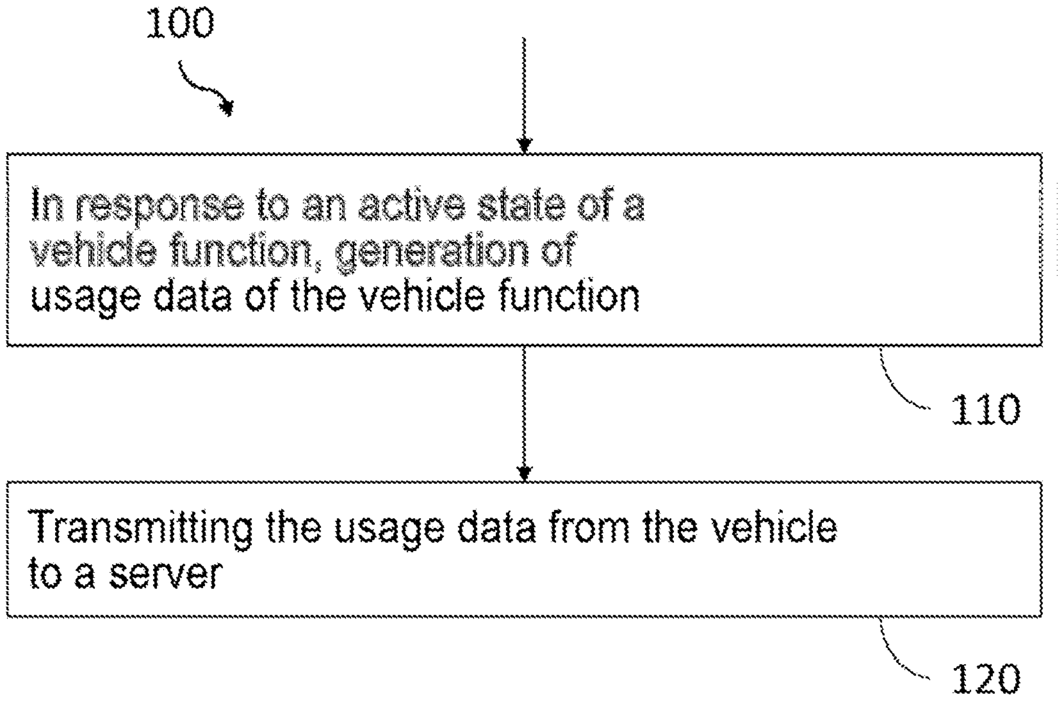
FIG. 1 shows a flowchart of an example of a method for detecting a vehicle function of a vehicle.

FIG. 1 shows the flowchart of an example of a method 100 for detecting a vehicle function of a vehicle. The method 100 can be carried out by means of a suitable electronic circuit, such as a control unit of the vehicle. The control unit can, for example, contain a machine-readable storage medium on which is stored a program containing program code that carries out the method 100 when the program is executed on a processor or programmable hardware. In some exemplary embodiments, steps of the method 100 can be carried out by multiple processors and/or vehicle-internal/external control units.

For the method 100 it should be assumed that the vehicle mentioned contains a plurality of energy paths and a plurality of energy consumers. Each energy path of the plurality of energy paths contains at least one energy consumer of the plurality of energy consumers. Such a vehicle may be any system for the transport of persons or goods that contains a chassis that is driven by an engine. In particular, the vehicle can be a car, a truck, a motorcycle or a tractor.

The vehicle function may be any function provided for the vehicle, the performance of which requires at least one energy consumer installed in the vehicle. The vehicle function can be a comfort function, a driver assistance function, a safety function or an infotainment function, for example. Examples of vehicle functions are air conditioning, seat heating, windshield heating, vehicle dynamics control, door locking, interior lighting, navigation, automatic emergency braking, parking assist, lane keeping assist, steering assist, adaptive cruise control, lane departure warning, window operation or collision detection.

For the purposes of the present disclosure, it is assumed the multiple vehicle functions are integrated into the vehicle and at least the vehicle function to be detected has an identifier, which makes the vehicle function clearly identifiable among the multiple vehicle functions. The vehicle function identifier can be identical for vehicles of the same type in which the vehicle function is integrated. For example, when the vehicle function is implemented in the vehicle, the identifier can be assigned to the vehicle function and stored in a control unit of the vehicle.

The vehicle functions may differ from each other due to the energy consumer required for their performance and/or the necessary operating setting of the energy consumers. A vehicle function can be integrated when the vehicle is manufactured, for example by implementing the energy consumers required for the vehicle function in the vehicle. The vehicle functions can be performed by the activation and operation of at least one of the associated energy consumers. The performance of a vehicle function may require the simultaneous or sequential activation of multiple energy consumers.

Which energy consumer and which operating setting of the energy consumer for the performance of the vehicle function may have been specified when the vehicle function was implemented in the vehicle. For this purpose, an association of a unique identifier of the energy consumer with the identifier of the vehicle function can be stored in a database of the vehicle. Such an association can result in a so-called address chain of the vehicle function by data-related chaining of the identifiers (addresses). Information about the required operating setting of the energy consumer can be linked to the address chain. An example of an address chain is explained with reference to FIG. 2.

For the purposes of the present disclosure, an energy consumer may mean any device which is at least partially electrically operated for performing a vehicle function of the vehicle. For example, an energy consumer can be a sensor, a control unit, an actuator, a timer, a gateway, a display element, a lighting element, a power distributor, a user interface, a back-end interface or an electric motor. An energy consumer may be required to perform one or more vehicle functions.

An energy consumer can be connected by at least one energy path to an electrical energy source of the vehicle, for example a battery, in order to perform a vehicle function. The energy paths can be understood as load paths of an on-board electrical system of the vehicle. The energy paths can be any system for the provision of electrical energy for at least one energy consumer of the plurality of energy consumers. The energy paths can be electrical conductors of any type, for example. Taken together, the energy paths of the on-board electrical system can form an energy network of the vehicle.

In addition to the energy network, the on-board electrical system may also include a communication network. The communication network can be partially coupled to the energy network. The communication network can be understood as a set of communication paths between communication nodes of the vehicle. Communication paths can, for example, facilitate data communication between energy consumers (or their higher-level controls), control units and/or the power distributors of the vehicle. A communication path can be any system for the wired or wireless transmission of data between the communication nodes. Such a communication path can be a data bus, for example a CAN (Controller Area Network) bus, CAN FD (Flexible Data) bus, FlexRay bus, Ethernet bus, K bus, LIN (Local Interconnect Network) bus or MOST (Media Oriented System Transport) bus.

Referring to FIG. 1: the method 100 includes the generation 110 of usage data of the vehicle function in response to an active state of the vehicle function in the vehicle.

The active state of the vehicle function can correspond to a performance of the vehicle function. The active state can be triggered by a request (demand) for the vehicle function, in some exemplary embodiments, even if the vehicle function is not performed, for example if the vehicle function is not performed due to a defect or insufficient energy supply. The request and the attempt to call up the vehicle function can then also be detected by the method 100.

In order to perform the vehicle function, it is necessary to operate at least one energy consumer associated with it. A vehicle control unit can control the performance of the vehicle function, i.e. can activate or deactivate the vehicle function, or set operating parameters of the energy consumer associated with the vehicle function. During and after activation of the vehicle function or when the associated energy consumers are in operation, the vehicle function is in the active state. This applies until after the vehicle function has been deactivated.

For example, the control unit can respond to a user request or a vehicle request to activate/deactivate the vehicle function and can control the performance of the vehicle function accordingly. Activating the vehicle function can include activating an energy path whereby at least one energy consumer associated with the vehicle function is supplied with electrical energy to perform the vehicle function. The active state of the vehicle function can therefore provide information about a usage of the vehicle, for example about the fact that the vehicle function is being performed and which energy paths and energy consumers involved are in the performance.

This means that usage data can be derived from the active state. The usage data indicate an identifier of the vehicle function, an associated identifier of an energy path of the plurality of energy paths, and an associated identifier of an energy consumer of the plurality of energy consumers. The usage data are indicative of an active energy path for the provision of electrical energy to the energy consumer due to the active state of the vehicle function.

The generation 110 of the usage data may include, for example, receiving the identifier of the vehicle function, the identifier of the energy path and the identifier of the energy consumer. The energy consumer or a control system at a higher level than the energy consumer can be designed to transmit the identifiers if the energy path provides electrical energy to the energy consumer at the relevant time due to the active state of the vehicle function (i.e. for a performance of the vehicle function). The energy consumer can transmit the identifiers, for example at regular time intervals, when triggered by a (such as an activation of the energy trigger event consumer or a change in the operating parameters of the energy consumer), or on a request of a control unit carrying out the method 100.

The generation 110 of the usage data may include receiving multiple identifiers of energy paths and energy consumers associated with the identifier of the vehicle function. In this case, receiving the multiple identifiers is indicative of fact that the corresponding energy paths provide electrical energy to the energy paths to perform the vehicle function. A link between the energy path identifiers and the energy consumer identifiers can also be transmitted, wherein the link indicates which energy path supplies which energy consumer. The usage data can provide information about which energy paths supply which energy consumers at a certain point in time for performance of the vehicle function. The usage data can include, for example, a time stamp that shows the point in time at which the provision of electrical energy by the energy consumers was recorded. The method 100 may include receiving usage data for multiple points in time in order to record a temporal history of the use of the vehicle function. In some exemplary embodiments, the method 100 involves generating usage data of another vehicle function in response to an active state of the other vehicle function in the vehicle. As a result, the method 100 can include detecting multiple or all active vehicle functions of the vehicle.

The generation 110 of the usage data can include data linking of the recorded identifiers of the vehicle function(s), the associated energy consumers and energy paths. In addition, generating 110 the usage data can include storing and merging data in a database. The generation 110 of the usage data may include linking the data to an address chain of the vehicle function.

For the collection of data about individual energy consumers and energy paths, a special configuration of the on-board electrical system of the vehicle can be advantageous. For example, the on-board electrical system of the vehicle can be designed in such a way that allows switching of a significant part of the energy paths of the plurality of energy paths (about 30% of the energy paths). An energy path can be switchable by means of a controllable switching element, such as a semiconductor switching element or a relay. The on-board electrical system of the vehicle may include one or more power distributors that can activate one or more switching elements.

The power distributor can open a switching element of an energy path to disconnect a connected energy consumer from the energy supply by the energy path. The power distributor can close the switching element to establish supply: this can be described as activating the energy the energy path. Such a switching element and such a power distributor can be provided in the vehicle to protect the energy paths, for example against excessive currents. For this purpose, measuring equipment is provided in the power distributors, for example for current and voltage measurements on each of the associated energy paths. The measuring devices can pass on measured values of the current and voltage measurements to the respective power distributor, which in turn can derive from the measured values which energy paths are supplying which energy consumers with electrical energy. The power distributor can retrieve the identifiers of the energy paths and energy consumers and transmit them via a communication network of the vehicle to a control unit carrying out the method 100.

In some exemplary embodiments, the method 100 may include receiving the environmental data of the vehicle, the operating data of the energy consumer and/or the operating data of the energy path. The generation 110 of the usage data may include associating the environmental data, the operating data of the energy consumer and/or the operating data of the energy path with the identifier of the vehicle function. This can enable a detailed evaluation of the usage data depending on environmental influences.

The on-board electrical system can contain sensors that capture the environmental data of the vehicle. For example, the sensors can be designed to capture environmental data during an active state or when the vehicle function is activated. The sensors can be connected to the communication network of the vehicle in order to pass on the environmental data to a control unit carrying out the method 100. The environmental data can show, for example, a temperature and humidity of the environment of the vehicle, an altitude or georeference of the vehicle.

The operating data may include, for example, the energy demand of the energy consumers, the utilization of processors in the controls of the vehicle, the communication volume in the communication network of the vehicle and a temporal variation during operation when energy consumers or energy paths are activated/deactivated.

In some exemplary embodiments, the method 100 also includes receiving an identifier of a vehicle user and/or an identifier of the vehicle. The generation 110 of the usage data then also includes associating the identifier of the vehicle user and/or the vehicle with the identifier of the vehicle function. This may include user-specific or vehicle-specific evaluation of usage data. In addition, usage data may include information about whether and when a vehicle user is in the vehicle and how many vehicle users are in the vehicle. For this purpose, an optical observation system can be integrated into the vehicle, for example, which can detect and classify people in the vehicle interior. Alternatively, the vehicle can include a key detection system that can detect proximity to a user-specific vehicle key.

In some exemplary embodiments, the method 100 also includes selective activation of an energy path associated with to the vehicle function in order to provide electrical energy to an energy consumer in response to activation of the vehicle function in the vehicle. A control unit carrying out the method 100 can, for example, send a command to activate the energy path via a communication coupling to a power distributor of the energy path. If a specific vehicle function is to be called up that requires the activation of a specific energy consumer, the control unit can activate a power distributor, which then activates an energy path to the energy consumer. In order to determine which energy paths and which energy consumers must be activated to activate the vehicle the method 100 can include function, retrieving an address chain of the vehicle function. The address chain contains a fixed association of energy consumers required for the performance of the vehicle function and energy paths to the vehicle function. Such an association can be made, for example, when the vehicle is manufactured or when the vehicle function is implemented. For example, the energy consumers and energy paths can be uniquely identifiable by their identifiers. The identifier of the energy consumer and the identifier of the energy path may be stored in the control unit and linked to an identifier of the vehicle function.

Referring to FIG. 1: the method 100 also includes transmission 120 of the usage data from the vehicle to a server. The server is a vehicle-external computer that is connected to the vehicle for communication, for example via a radio connection. For example, the server can be a backend server of the vehicle manufacturer.

The transmission 120 of the usage data can be done, for example, at regular time intervals or when the usage data are requested by the server. The server can be designed to evaluate the vehicle function based on the usage data. For example, the server can carry out a method for evaluating a vehicle function, and an example of such a method is explained with reference to FIG. 3.

If one assumes a large number of energy paths, energy consumers and vehicle functions as well as a complex functional linking of these, a "fine-grained" determination of vehicle usage data can be advantageous. A method according to the disclosure, such as the method 100, can make it possible to determine usage data of each individual energy consumer and to link them to the vehicle function that causes the operation of the respective energy consumer.

The method 100 can efficiently contribute to describing and evaluating the usage behavior not only of the vehicle, but also of the individual energy consumers (affected systems). The method 100 can achieve this, for example, by the use of address chains, the central retrieval of usage data and system-specific data capture. The method 100 can transmit vehicle usage data to a server that can collect usage data from multiple vehicles and evaluate these data for usage analysis.

Figure 2:
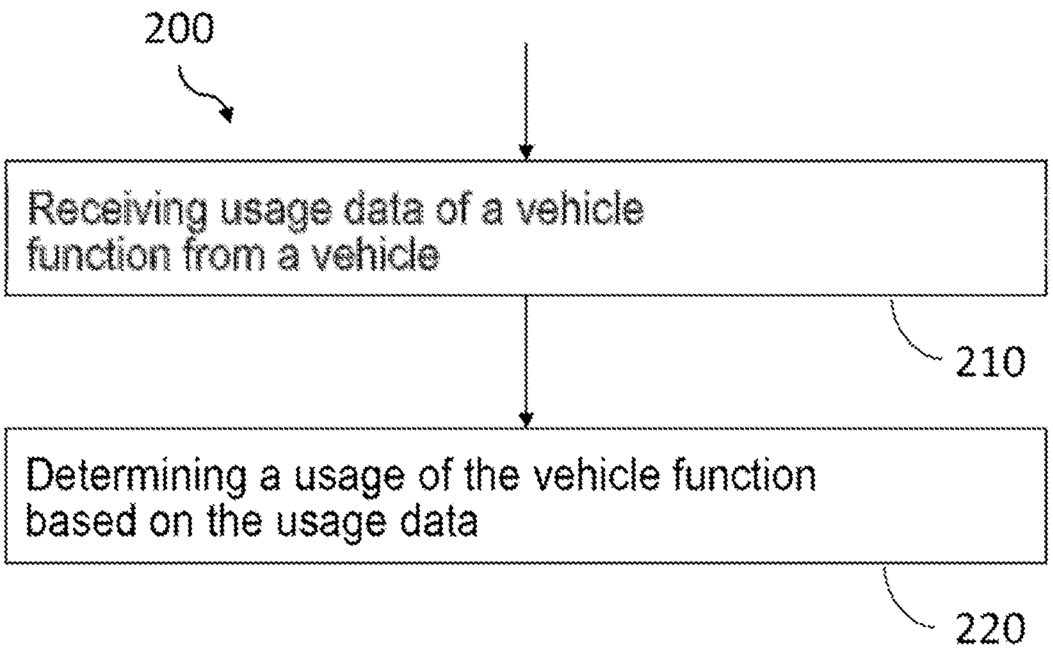
FIG. 2 shows a flowchart of an example of a method for evaluating a vehicle function of a vehicle.

FIG. 2 shows a flow diagram of an example of a method 200 for the evaluation of a vehicle function of the vehicle. The method 200 can be carried out by a server, for example. For example, the server may contain a machine-readable storage medium on which a program is stored with a program code that carries out the method 200 if the program is run on a processor or programmable hardware.

As described above, the vehicle contains a plurality of energy paths and a plurality of energy consumers, wherein each energy path of the plurality of energy paths contains at least one energy consumer of the plurality of energy consumers.

The method 200 includes receiving 210 vehicle function usage data from the vehicle. As described above, the usage data contain at least one identifier of the vehicle function, an associated identifier of at least one energy path of the plurality of energy paths and an associated identifier of at least one energy consumer of the plurality of energy consumers. The usage data are also indicative of an active energy path for the provision of electrical energy to the energy consumer due to the active state of the vehicle function.

The method 200 also includes determining 220 a usage of the vehicle function based on the usage data. In particular, the method 200 can determine a usage of the vehicle function in relation to individual energy consumers, energy paths and/or communication paths of the vehicle that are active for the performance of the vehicle function.

In particular, the usage data may indicate the operation and activation or deactivation of multiple energy consumers, communication paths and/or energy paths of the vehicle for the performance of the vehicle function. For this purpose, the usage data include the respective identifiers associated with the identifier of the vehicle 200 the usage of the vehicle function. Determining function may include determining the switching and operating sequences of the vehicle function based on the operation and the activation/deactivation of the associated systems.

Determining 220 the usage of the vehicle function may include determining the duration and/or frequency of usage of the energy consumer or the energy path. For this purpose, the method 200 may include receiving usage data for a specific observation period. The usage data can be captured and stored in the vehicle for the observation period and sent on demand to the server carrying out the method 200. Alternatively, the server can receive the usage data continuously over the observation period.

From the temporal profile of an operation of the energy consumer, the energy path and/or a communication path, the method 200 can determine a period of usage and/or frequency of usage. The period of usage and/or the frequency of usage is/are related to the vehicle function, i.e.: for example, a period of usage of an energy consumer refers to the length of time that the energy consumer was active to perform a certain vehicle function.

The method 200 can be used to determine a period of usage and/or frequency of usage of multiple energy consumers, energy paths and/or communication paths that are active for the performance of the vehicle function based on the usage data. In some exemplary embodiments, the method 200 includes determining a usage of the vehicle based on usage data of multiple vehicle functions of the vehicle.

In some exemplary embodiments, the method 200 includes receiving usage data of the vehicle function from multiple vehicles in which the vehicle function is implemented. Determining 220 the usage of the vehicle function then includes an evaluation of the usage data of the multiple vehicles. The identifier of the vehicle function is identical for the multiple vehicles for this purpose. This allows the usage of the vehicle function in different vehicles and by different users to be analyzed. From this, it can be deduced, for example, which vehicle functions are used more frequently than other vehicle functions, at which times or under what conditions they are used, and which vehicle functions are used together or used depending on each other. Based on data sets of multiple vehicles and multiple vehicle functions (in particular the most complete collection of usage data of all vehicle functions), the method 200 can carry out statistical analyses of the usage behavior of the users of the vehicles and the usage of the individual vehicle systems.

The usage data may also include environmental data of the vehicle, operating data of the energy consumer, operating data of the energy path, an identifier of the vehicle and/or an identifier of the vehicle user. This allows the method 200 to provide a vehicle-specific, user-specific evaluation of the usage data and, for example, to create a prediction of usage patterns. Based on the operating data, the method 200 can determine the utilization of vehicle systems (energy consumers, energy paths, communication paths). For example, the method 200 can record processor utilizations as well as processor reserves, communication volumes, energy flows or outliers in the vehicle's energy demand based on the usage of the vehicle function(s).

Based on the usage duration and/or frequency, the method 200 can carry out an analysis of the ageing of energy consumers, energy paths and/or communication paths caused by their use. The method 200 can monitor service life of components and control units of the vehicle as well as a service life of an energy supply in the vehicle, of a communication system for communication in and with the vehicle, for example. This allows the method 200 to create an aging model of the vehicle systems based on historical usage data and thus predict maintenance of vehicle systems of the same type based on the usage data thereof.

In addition, the method 200 can optimize the on-board electrical system design of vehicles based on the usage of vehicle functions. For an electrical energy supply of the vehicles, subnetworks of the on-board electrical system (for example networks of systems such as control units or sensors/actuators) can be designed to match the determined usage of the vehicle functions (frequency distributions). A combination of address chains of the vehicle function can define a form of the subnetworks. This makes it possible to create an energy-efficient and cost-efficient on-board electrical system with a small number of subnetworks.

The method 200 can enable a customer-specific, vehicle-specific evaluation of usage data of one or more vehicle functions in one or more vehicles. Using the analysis method, the method 200 can determine which vehicle functions are activated and how high the utilization of the associated energy consumers is. This allows energy paths to be optimized in line with usage behavior in terms of energy consumer and service life as well as costs.

Determining 220 the usage of the vehicle function can include applying a clustering method, a pattern recognition method, an association method, a classification method, a statistical analysis method and/or a prediction method, for example with neural networks, to the usage data. Determining 220 the usage can include referencing the usage data, for example to other data groups such as season, time of day, georeference, etc.

The method 200 can also enable a user-specific implementation of vehicle functions in the vehicle (when the vehicle is put into service or when the vehicle is updated).

Figure 3:
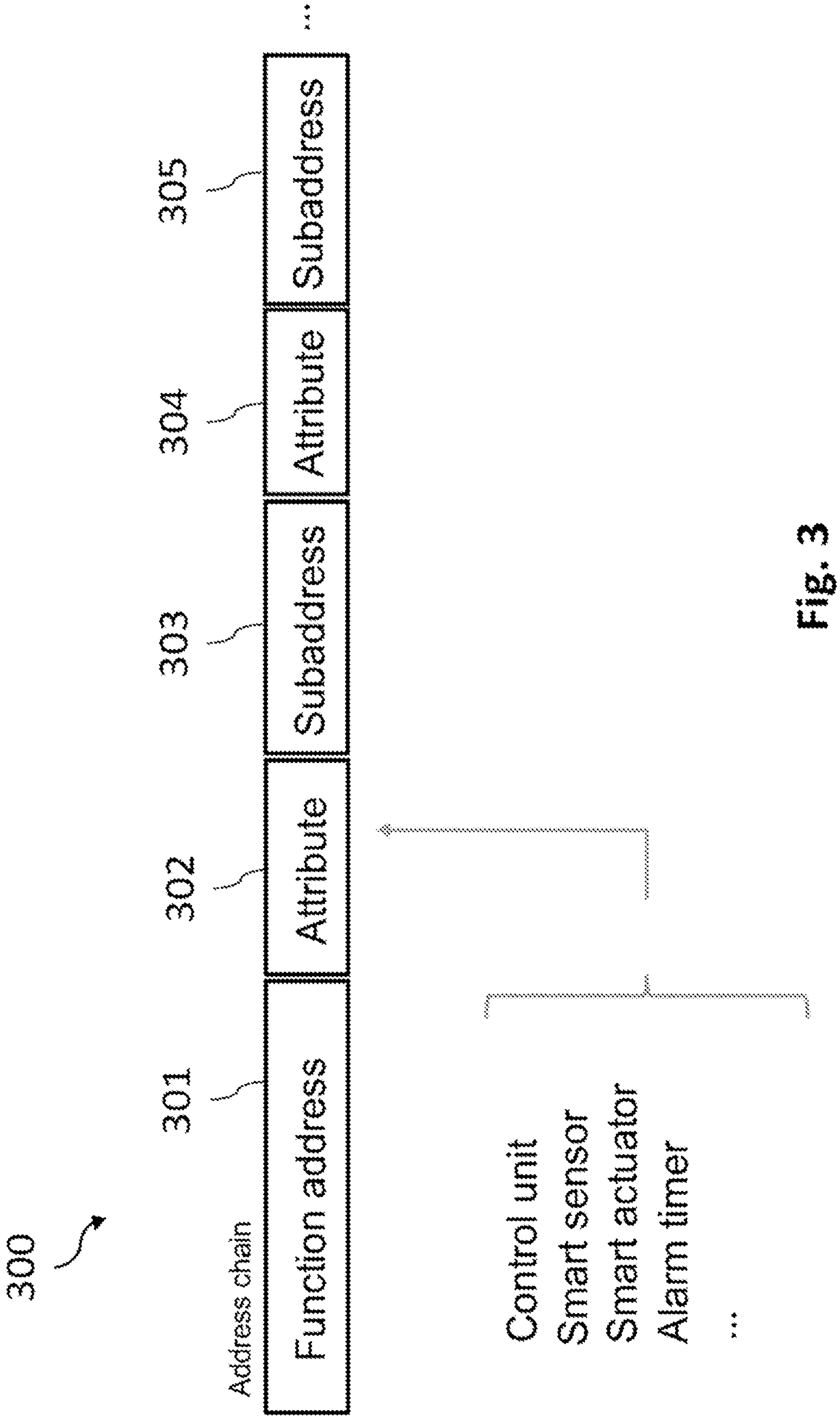
FIG. 3 shows a schematic representation of an example of an address chain of a vehicle function.

FIG. 3 shows a schematic representation of an example of an address chain 300. The address chain is an association of energy consumers, energy paths and/or communication paths of a vehicle (or their identifiers) with an identifier (address) of a vehicle function of the vehicle. Those energy consumers, energy paths and/or communication paths that are to be activated when the vehicle function is activated are associated with the vehicle function. The association may have taken place, for example, by registration of the vehicle function when the vehicle function was implemented in the vehicle. The representation of the address chain 300 shown in FIG. 3 can be understood as a meta-level of a data structure (design) of the address chain 300.

In a first data field 301 of the address chain 300, the identifier of the vehicle function ("Funktionsaddresse") is placed. The identifier can be any sequence of characters that uniquely identifies the vehicle function, which is stored in a data memory, for example as a digitally encoded numerical value. Other data fields 302 to 305 are data linked to the first data field 301, for example in the form of a data set. In the further data fields 302 to 305 are stored a designation ("Attribut") and an identifier ("Subaddresse") of energy consumers necessary for performance of the vehicle function. In FIG. 3, by way of example, the control unit, smart sensor, smart actuator and alarm timer are listed as energy consumers.

The address chain 300 can be dynamically configured (learning, adaptation), i.e., in case of changes in the settings of the vehicle function (caused by an update) the vehicle function can be re-registered and the address chain 300 can be adapted.

Figure 4:
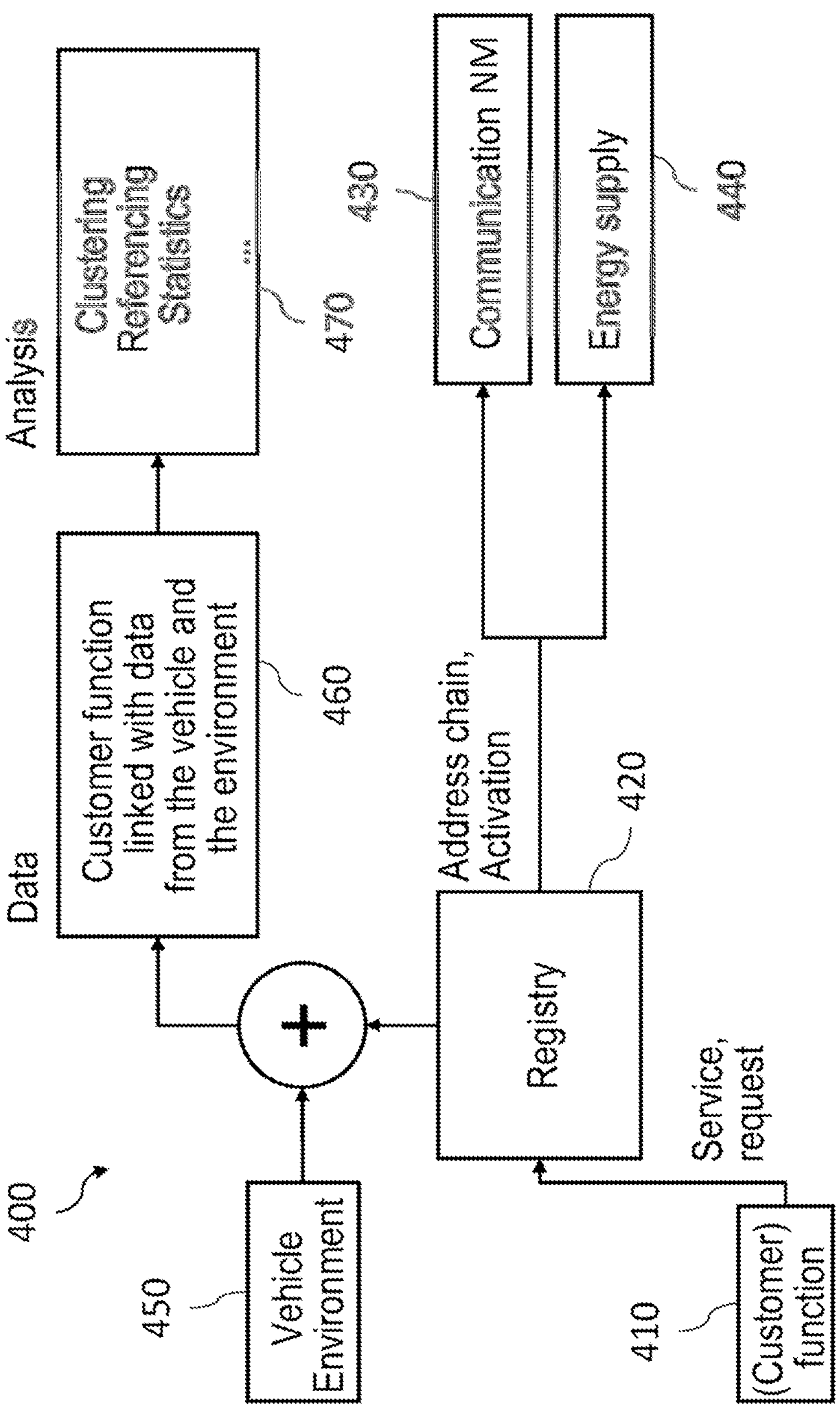
FIG. 4 shows a schematic representation of an example of a method for detecting and evaluating a vehicle function of a vehicle.

FIG. 4 shows a schematic representation of an example of a method 400 for detecting and evaluating a vehicle function of a vehicle. The method 400 involves receiving a request to activate a vehicle function (customer function), for example based on an operation or request of a vehicle user. The request contains an identifier of the vehicle function.

The method 400 includes a retrieval 420 of an address chain of the vehicle function corresponding to the identifier of the vehicle function. The address chain is retrieved from a database (registry) in which the identifier was recorded when the vehicle function was registered. The address chain contains an association of energy consumers, energy paths, and communication paths necessary to perform the vehicle function.

The method 400 includes activating the energy paths associated with the vehicle function and communication paths for activating the energy consumers, which in turn perform the vehicle function. The method 400 includes the activation 430 of a communication network (Communication Network Management (NM)) of the vehicle and the activation 440 of an energy network (energy supply) of the vehicle for this.

The method 400 includes the receiving 450 vehicle and environmental data. The Vehicle data may include, for example, a vehicle identification number (identifier of the vehicle) or operating data of vehicle systems of the vehicle. The environmental data may include measurement data generated by sensors in the vehicle regarding the temperature of the vehicle environment or the vehicle altitude and georeference. For example, the sensors may have been activated in order to generate the measurement data when the vehicle function was activated.

The method 400 includes the generation of usage data by linking 460 the vehicle data and environmental data with the identifier of the vehicle function. The usage data can then be transmitted from the vehicle to a server for evaluation. The method 400 includes determining a usage of the vehicle function by evaluating 470 the usage data, for example based on a clustering method, referencing or statistical analysis of the usage data.

Figure 5:
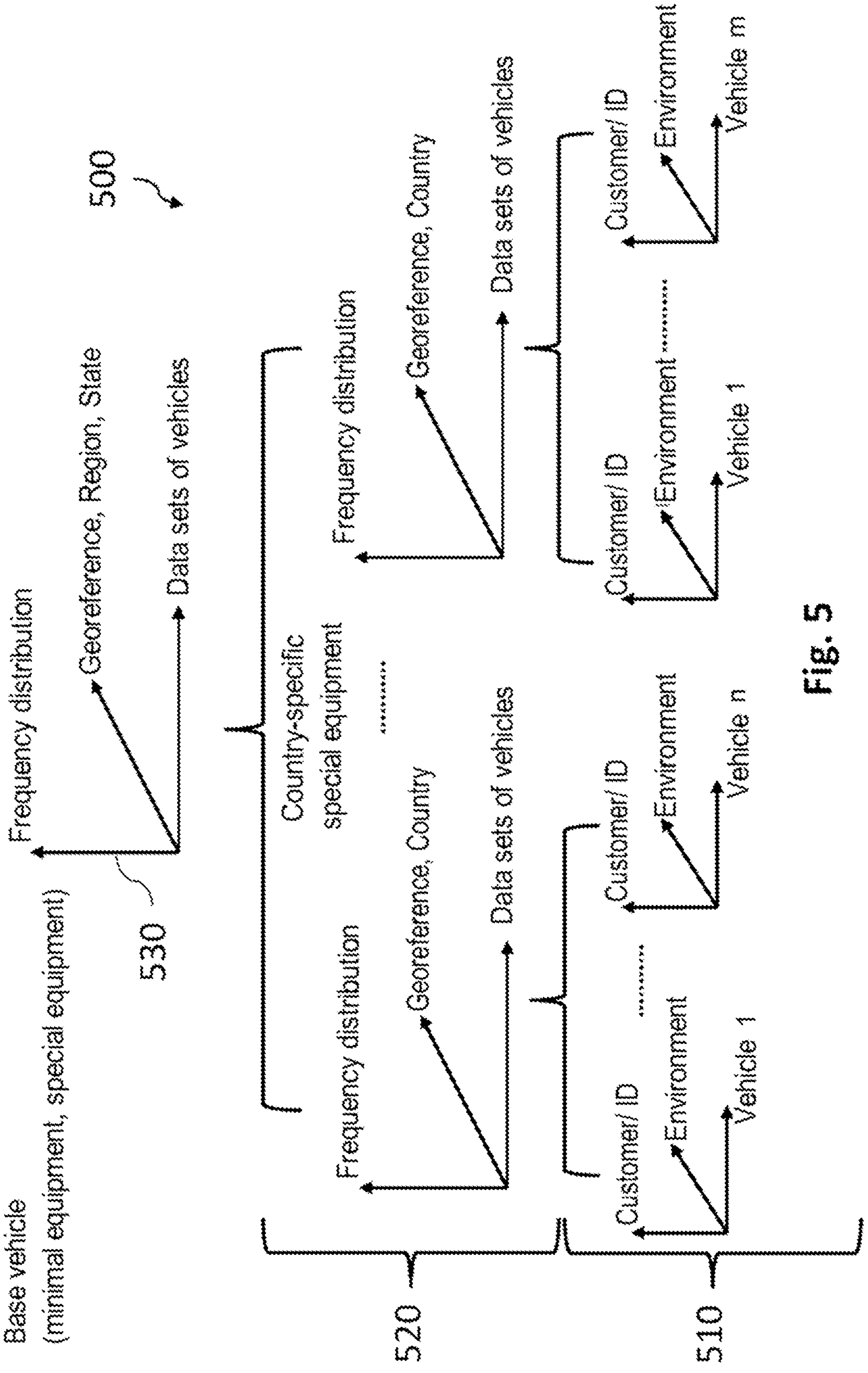
FIG. 5 shows a schematic representation of an example of a method for evaluating a vehicle function.

FIG. 5 shows a schematic representation of an example of a method 500 for the evaluation of a vehicle function. In a first level 510, the method 500 includes receiving usage data of the vehicle function from multiple vehicles and determination of a usage of the vehicle function based on the usage data. The usage data are linked to an identifier (identification number (ID)) of the vehicle function, a user identifier and environmental data of the vehicles. Determining the usage of the vehicle function can include ID-specific and user-specific evaluation of the usage data depending on the environmental data. Furthermore, the method 500 includes determination of a usage of multiple vehicle functions of the vehicles.

In a second level 520, the method 500 includes linking the usage data with a respective georeference of the vehicles. This results in a country-specific usage distribution (for example distribution of a frequency of usage) of the vehicle function(s) for a vehicle fleet.

In a third level 530, the method 500 includes the derivation of a range of functions of a base vehicle from the country-specific usage distribution. To this end, the country-specific usage distributions (possibly for a region at a higher level than the countries) are aggregated and a minimum system equipment or configuration that the base vehicle should have is determined. I.e., the most frequently used vehicle functions (smallest common subset of the vehicle function ID) are determined, which are to be implemented in a base vehicle in order to meet a requirement of as many vehicle users as possible.

During the production of vehicles, a country-specific vehicle equipment (i.e. vehicle functions frequently used in the respective countries) can be added to the vehicles. In a subsequent step, this country-specific vehicle equipment can be augmented with special equipment, i.e. with user-specific vehicle functions. The special equipment can be determined, for example, on the basis of a user-specific usage of vehicle functions. User-specific suggestions can be made for special equipment for an online sale or for a personalized remote software update.

Figure 6:
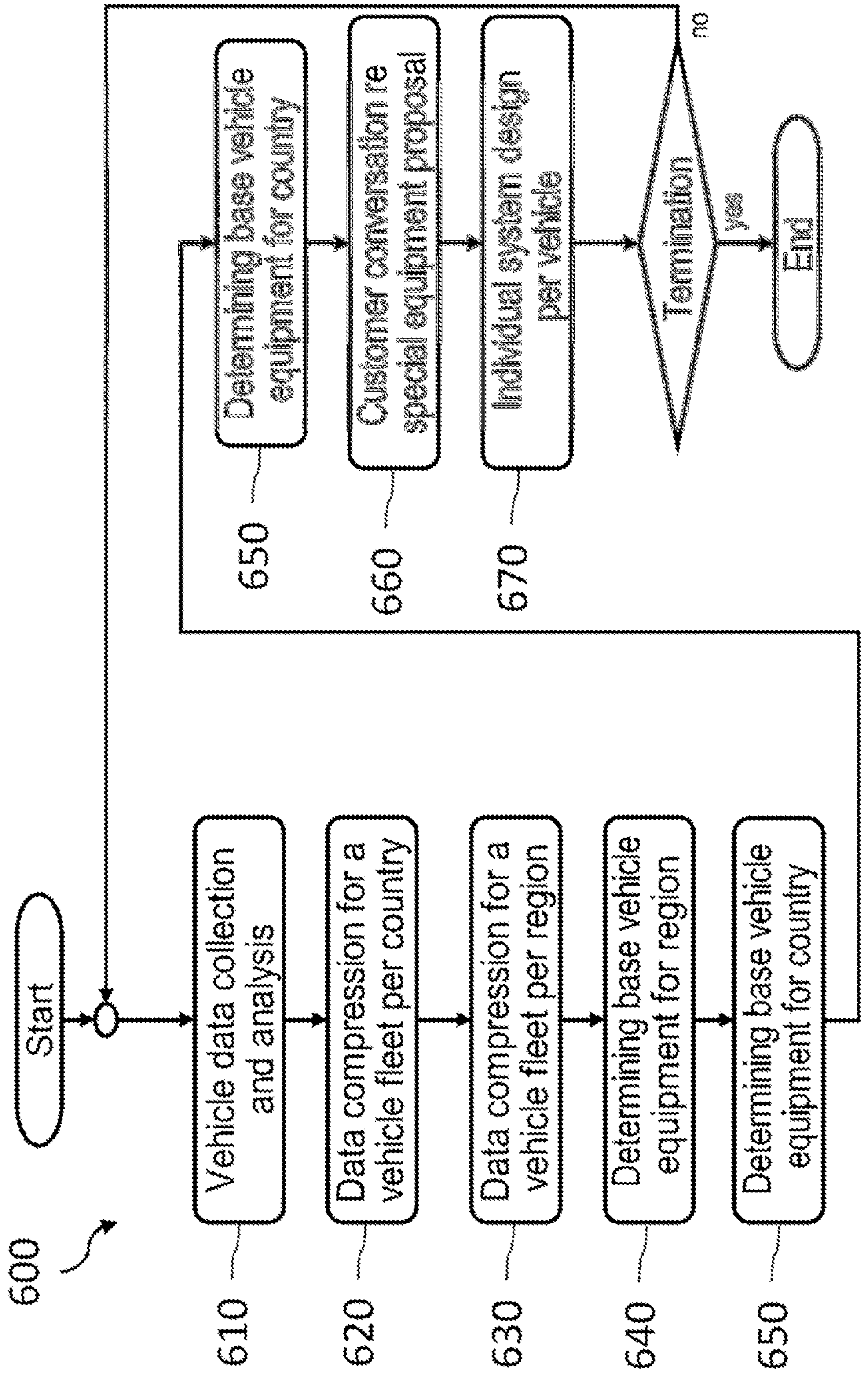
FIG. 6 shows a flowchart of an example of a method for evaluating a vehicle function.

FIG. 6 shows a flow diagram of an example of a method 600 for the evaluation of a vehicle function.

In a first step 610, the method 600 includes receiving 610 vehicle function usage data (data collection) from multiple vehicles and determining a usage of the vehicle function based on the usage data (analysis). For this purpose, respective usage data for each vehicle are evaluated.

In a second step 620, the method 600 includes a country-by-country evaluation of the usage data of multiple vehicles. This condenses the usage data of a vehicle fleet (the multiple vehicles) per country. In a third step 630, the method 600 includes a region-specific evaluation of the usage data. This condenses the usage data of the vehicle fleet per region. In a fourth step 640, the method 600 includes determining the equipment of a base vehicle per region based on the usage data. In a fifth step 650, the method 600 involves determining the equipment of a base vehicle per country based on the usage data. In a sixth step 660, the method 600 includes the creation of a user-specific proposal for special equipment based on the user's usage behavior or a customer conversation. In a seventh step 670, the method 600 includes determining a user-specific system design for each vehicle based on user data and user-specific special equipment.

Further exemplary embodiments of the present disclosure relate to a control unit for detecting a vehicle function of a vehicle. For example, the control unit may be designed to carry out a method for detecting the vehicle function, such as the method 100.

Further exemplary embodiments of the present disclosure relate to a server for the evaluation of a vehicle function of a vehicle.

Further details and aspects of the control unit or server will be discussed in connection with the proposed technology or one or more examples described above, for example by reference to FIG. 1 and FIG. 2 respectively. The control unit or server may include one or more additional optional features corresponding to one or more aspects of the proposed technology or to one or more of the examples described above.

A method for detecting a vehicle function, such as the method 100, as well as a control unit for detecting a vehicle function, can make it possible to link usage data of individual energy consumers, energy paths and communication paths of a vehicle with a corresponding vehicle function. A method for the evaluation of a vehicle function, such as the method 200, as well as a server for the evaluation of a vehicle function may use the usage data to contribute to the system optimization of the vehicle in terms of dimensioning, design, service life and costs of energy consumers, energy paths and communication paths in vehicles.

LIST OF REFERENCE SIGNS

100 Method
110 Generating usage data
120 Transmitting the usage data
200 Method
210 Receiving usage data
220 Determining a usage
300 Address chain
301 First data field
302-305 Further data fields
400 Method
410 Receiving a request
420 Retrieving an address chain
430 Activating a communication network
440 Activating an energy network
450 Receiving vehicle and environment data
460 Combining with vehicle function
470 Evaluating the usage data
500 Method
510 First level: vehicle
520 Second level: Land
530 Third level: Region
600 Method
610 First step: data collection
620 Second step: Data compression per country
630 Third step: Data compression per region
640 Fourth step: Determining base vehicle per region
650 Fifth step: Determining base vehicle per country
660 Sixth step: Determining special equipment
670 Seventh step: Determining customer

The invention claimed is:

1. A method for detecting a vehicle function of a vehicle, wherein the vehicle contains a plurality of energy paths and a plurality of energy consumers, wherein each energy path of the plurality of energy paths contains at least one energy consumer of the plurality of energy consumers, the method comprising:

in response to an active state of the vehicle function in the vehicle, generating usage data of the vehicle function, wherein the usage data include an identifier of the vehicle function stored in a vehicle control unit, an identifier of at least one energy path of the plurality of energy paths that is stored in the vehicle control unit, and that is associated with the identifier of the vehicle function, and an identifier of at least a first energy consumer of the plurality of energy consumers that is stored in the vehicle control unit, and that is associated with the identifier of the vehicle function, wherein the usage data are indicative of an energy path that is active based on the active state of the vehicle function for the provision of electrical energy to the first energy consumer, wherein at least one further energy path is capable of the provision of electrical energy to the first energy consumer; and transmitting of the usage data from the vehicle to a server.

2. The method as claimed in claim 1, further including:

receiving identification information comprising at least one of the group comprising an identifier of a vehicle user and an identifier of the vehicle, wherein the generation of the usage data also includes an association of the identification information with the identifier of the vehicle function.

3. The method of as claimed in claim 2, wherein the identification information comprises the identifier of the vehicle user and the identifier of the vehicle.

4. The method as claimed in claim 2, further including:
receiving further data comprising at least one of the group consisting of vehicle environment data, energy consumer operating data, and energy path operating data,
wherein the generation of the usage data includes association of the further data with the identifier of the vehicle function.

5. The method as claimed in claim 1, further including:
receiving further data comprising at least one of the group consisting of vehicle environment data, energy consumer operating data, and energy path operating data,
wherein the generation of the usage data includes association of the further data with the identifier of the vehicle function.

6. The method as claimed in claim 5, wherein the further data comprises vehicle environment data, energy consumer operating data, and energy path operating data,
wherein the generation of the usage data includes association of the vehicle environment data, energy consumer operating data, and energy path operating data with the identifier of the vehicle function.

7. The method as claimed in claim 1, further including:
in response to activation of the vehicle function in the vehicle, selective activation of the energy path to provide electrical energy to the first energy consumer.

8. The method as claimed in claim 1, further including:
in response to an active state of a further vehicle function in the vehicle, generating usage data of the further vehicle function; and
transmission of the usage data of the further vehicle function from the vehicle to a server.

9. A method for evaluation of a vehicle function of a vehicle, wherein the vehicle contains a plurality of energy paths and a plurality of energy consumers, wherein each energy path of the plurality of energy paths contains at least one energy consumer of the plurality of energy consumers, including:
receiving vehicle function usage data from the vehicle,
wherein the usage data contain an identifier of the vehicle function, an associated identifier of at least one energy path of the plurality of energy paths, and an associated identifier of at least a first energy consumer of the plurality of energy consumers,
wherein the usage data are indicative of an active energy path for the provision of electrical energy to the first energy consumer due to an active state of the vehicle function, wherein at least one further energy path is capable of the provision of electrical energy to the first energy consumer; and
determining a usage of the vehicle function based on the usage data.

10. The method as claimed in claim 9, further including:
receiving vehicle function usage data from multiple vehicles in which the vehicle function is implemented,
wherein the determination of the usage of the vehicle function includes an evaluation of the usage data of the plurality of vehicles.

11. The method as claimed in claim 10,
wherein determining the usage of the vehicle function includes an application to the usage data of at least one of the group consisting of a clustering method, a pattern recognition method, an association method, a classification method, a statistical analysis method and a predication method.

12. The method as claimed in claim 9,
wherein determining the usage of the vehicle function includes an application to the usage data of at least one of the group consisting of a clustering method, a pattern recognition method, an association method, a classification method, a statistical analysis method and a predication method.

13. A control unit for detecting a vehicle function of a vehicle, wherein the vehicle contains a plurality of energy paths and a plurality of energy consumers, wherein each energy path of the plurality of energy paths contains at least one energy consumer of the plurality of energy consumers, containing:
a memory; and
a processing circuit configured to:
generate usage data of the vehicle function in response to an active state of the vehicle function in the vehicle,
wherein the usage data contain an identifier of the vehicle function stored in the memory, an associated identifier of at least one energy path of the plurality of energy paths stored in the memory, and an associated identifier of at least a first energy consumer of the plurality of energy consumers stored in the memory,
wherein the usage data are indicative of an active energy path for the provision of electrical energy to the first energy consumer due to the active state of the vehicle function,
wherein at least one further energy path is capable of the provision of electrical energy to the first energy consumer; and
transmit the usage data from the vehicle to a server.

14. The control unit of as claimed in claim 13, wherein the processing circuit is further configured to:
receive identification information comprising at least one of the group comprising an identifier of a vehicle user and an identifier of the vehicle,
wherein the generation of the usage data also includes an association of the identification information with the identifier of the vehicle function.

15. The control unit of as claimed in claim 14, wherein the processing circuit is further configured to:
receive further data comprising at least one of the group consisting of vehicle environment data, energy consumer operating data, and energy path operating data,
wherein the generation of the usage data includes association of the further data with the identifier of the vehicle function.

16. The control unit of as claimed in claim 13, wherein the processing circuit is further configured to:
receive further data comprising at least one of the group consisting of vehicle environment data, energy consumer operating data, and energy path operating data,
wherein the generation of the usage data includes association of the further data with the identifier of the vehicle function.

17. The control unit of as claimed in claim 13, further comprising a machine-readable storage medium on which is stored a program containing program code that generates the usage data of the vehicle function.

18. A server for the evaluation of a vehicle function of a vehicle, wherein the vehicle contains a plurality of energy paths and a plurality of energy consumers, wherein each energy path of the plurality of energy paths contains at least one energy consumer of the plurality of energy consumers, containing:

a processing circuit configured out to carry out the method of claim 9.

19. The method as claimed in claim 1, further comprising storing information linking the identifier of the vehicle function with the identifier of the at least one energy path and the identifier of the first energy consumer.

* * * * *